Feb. 4, 1969 J. E. ELMORE 3,425,731
SAFETY BOLT FOR MOTOR VEHICLE DOORS
Filed Feb. 16, 1966 Sheet 1 of 5
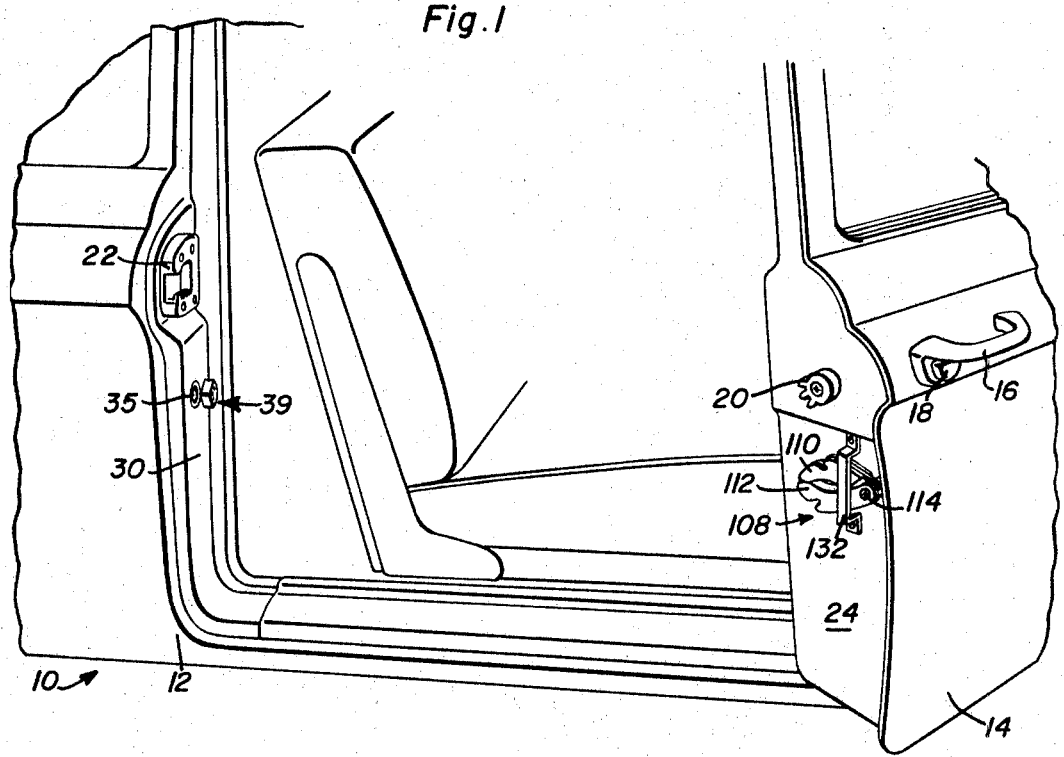
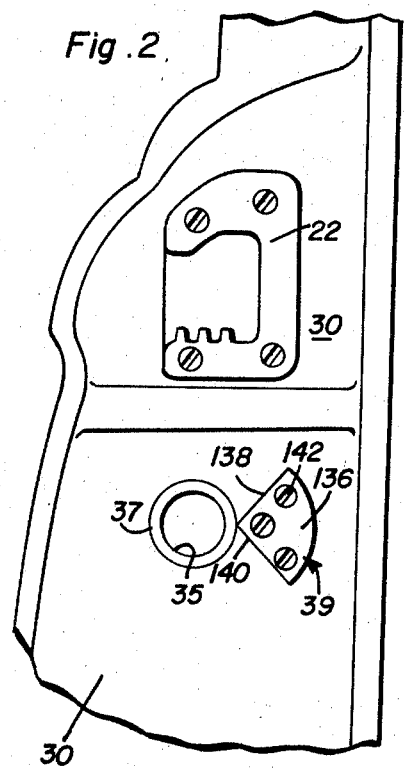
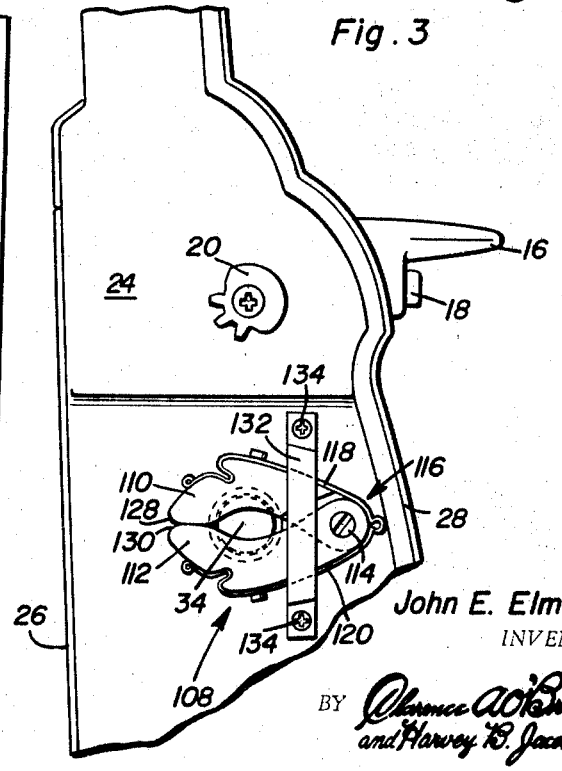
John E. Elmore
INVENTOR.

John E. Elmore
INVENTOR.

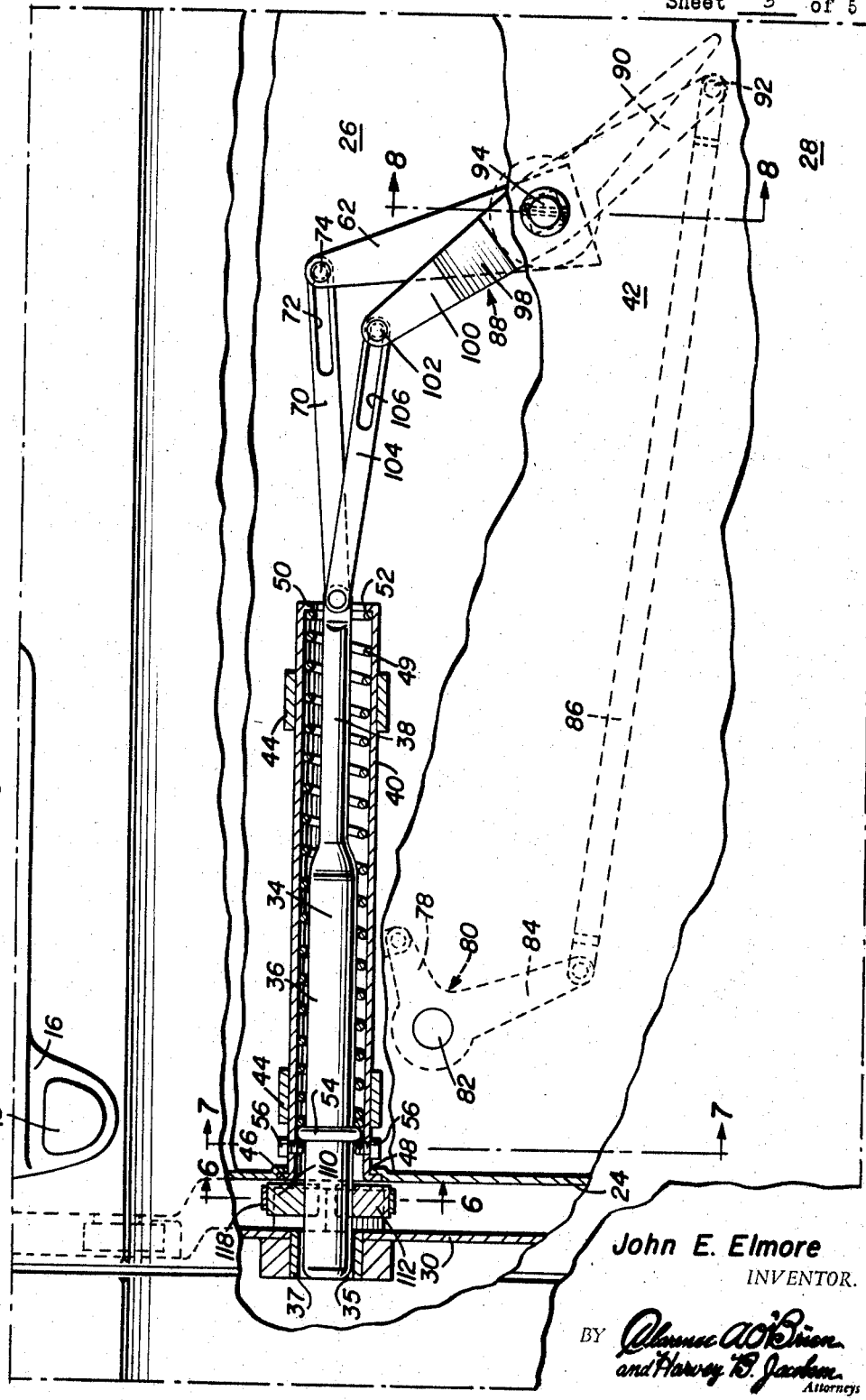

John E. Elmore
INVENTOR.

Feb. 4, 1969  J. E. ELMORE  3,425,731
SAFETY BOLT FOR MOTOR VEHICLE DOORS
Filed Feb. 16, 1966

John E. Elmore
INVENTOR.

United States Patent Office 3,425,731
Patented Feb. 4, 1969

3,425,731
SAFETY BOLT FOR MOTOR VEHICLE DOORS
John E. Elmore, Tarpon Springs, Fla.
(130 E. Virginia Lane, Clearwater, Fla. 33515)
Filed Feb. 16, 1966, Ser. No. 527,808
U.S. Cl. 292—335     8 Claims
Int. Cl. E05b 63/20

ABSTRACT OF THE DISCLOSURE

A locking mechanism for motor vehicle doors mounted within the door of a vehicle and activated by the inside and outside handles. To release the mechanism thereby allowing the opening of a vehicle door, one of the door handles is operated thereby displacing a linkage mechanism connected to the handle. The linkage mechanism is connected to a bolt which normally extends outwardly through the door and engages a keeper or receptacle within the car frame. The linkage displacement mechanically causes a similar displacement of the bolt from the keeper and withdraws the bolt into the door thereby allowing the door to be opened. As the external end of the bolt is withdrawn into the door, a latching mechanism located adjacent to the bolt end is closed thereby preventing the bolt from moving outwardly. When the door is being closed, the latching mechanism comes into contact with a striker plate located on the end panel of the car frame. As the engagement becomes complete, the latching mechanism is opened and the spring biased bolt is forced outwardly and the end of the bolt is received within the keeper thereby allowing the bolt to rest in its initial position and causing the vehicle door to be locked.

---

This invention relates generally to motor vehicles, and more particularly to safety bolts for motor vehicle doors.

In the past, a common cause of serious injury in motor vehicle accidents has been the inadequacy of the door lock mechanisms, whereby the doors often fly open upon impact and the passenger is forcibly ejected from the vehicle. Thus, the passengers have often been injured or killed due to this inadequate locking arrangement. This invention is directed to a solution of the above problem by providing automatically operated safety bolts for use on vehicles to prevent such accidental opening of the doors. The safety bolts of the instant invention are operated by either the inside and outside door handles of the vehicle so that the door may be opened by the normal turning of such handles. Further, when the door is closed, the bolt is automatically shot into a keeper chamber in the frame of the vehicle, thereby absolutely insuring that the doors will not open upon impact.

It is an object of the present invention to provide first and second embodiments of automatic safety bolt lock mechanisms for motor vehicle doors.

It is another object of the present invention to provide safety bolts for motor vehicle doors which will automatically operate upon closure of the doors thereby insuring that the doors will not be jarred open upon impact, such as often occurs during an accident when only conventional door lock mechanisms are used.

It is a further object of the present invention to provide first and second embodiments of novel means for holding the sliding bolt utilized in the instant invention in its retracted position when the door is opened.

It is still a further object of the present invention to provide novel actuating means for retracting the sliding bolt utilized in the instant invention.

It is another object of the present invention to provide an automatically actuated sliding bolt for motor vehicle doors which is retractible by independent actuation of either the inside or outside door handles.

It is a further object of the present invention to provide first and second embodiments of sliding bolt locks for vehicle doors which are inexpensive to manufacture while at the same time are extremely sturdy and rugged, and also quite efficient in use.

It is a further object of the present invention to provide first and second means for retaining a spring biased sliding bolt in withdrawn position when a vehicle door is open, and also automatically releasing the bolt when the door is closed whereby the bolt will shoot into a keeper in the vehicle frame and the door will be retained in its closed condition against accidental opening such as during an accident or the like.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a partial perspective view of a motor vehicle including the first embodiment of the present invention in place thereon;

FIGURE 2 is an enlarged elevational view of a portion of the vehicle frame illustrated in FIGURE 1;

FIGURE 3 is an enlarged elevational view of a portion of the vehicle door illustrated in FIGURE 1;

FIGURE 5 is a partial elevational view of the door illustrated in FIGURES 1 and 4 taken from outside the door, with parts broken away and enlarged to illustrate the operation of the sliding bolt mechanism comprising the first embodiment of the present invention;

Figure 4:
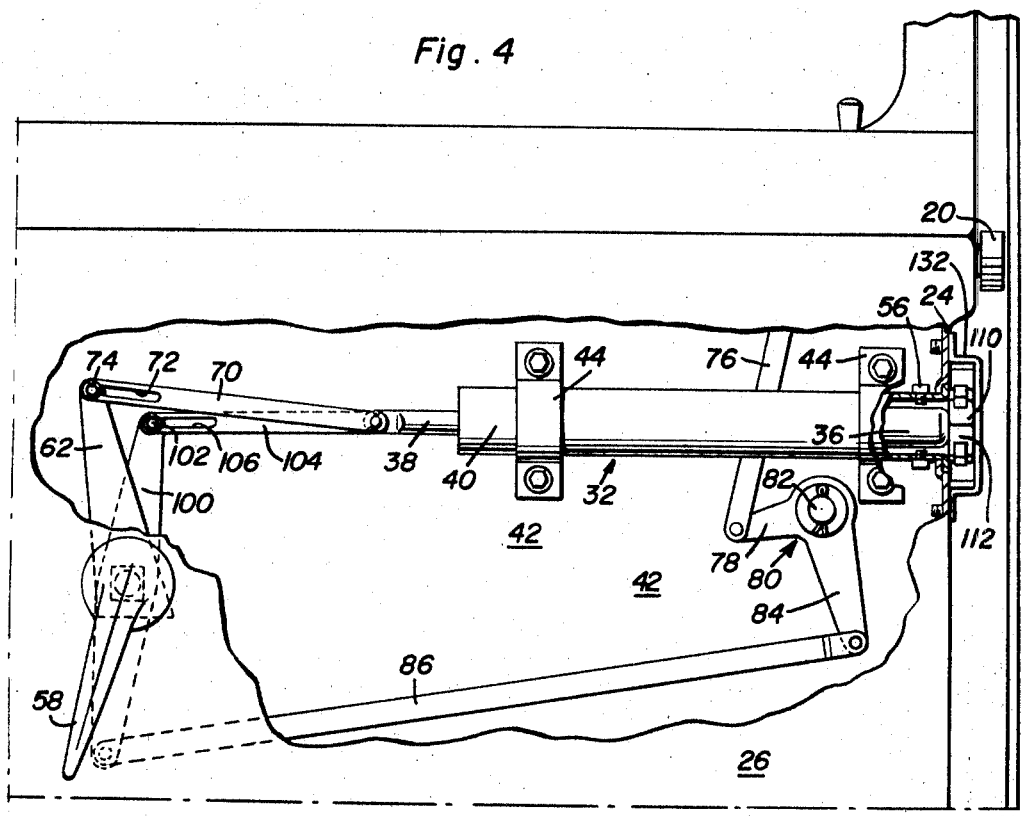
FIGURE 4 is a perspective view of a portion of the door illustrated in FIGURE 1 taken from inside the door, with parts broken away to illustrate the sliding bolt mechanism of the first embodiment of the present invention.

Referring now to the drawings with more particularity, and especially to FIGURES 1-8, reference numeral 10 generally denotes a motor vehicle such as an automobile having the safety bolt of the present invention mounted in place therein. The automobile 10 includes the usual body 12 having a pivotal door 14 in the side thereof with an outside handle 16 having the usual release latch 18 for normally retaining the door in closed position by means of the conventional lock mechanism denoted by reference numerals 20 and 22. The lock portion 20 is conventionally mounted on the end panel 24 of the door, the door normally also including inner and outer side panels 26 and 28 respectively. The lock portion 22 is normally mounted on the frame portion 30 for operating relationship with the lock portion 20. The safety bolt comprising the present invention is generally denoted by reference numeral 32, and is employed in addition to the conventional lock 20 and 22 in order to prevent accidental opening of the door 14 as often occurs during accidents and the like.

The frame 30 includes an opening or keeper chamber 35 therein, the chamber 35 having a bushing or insert 37 mounted therein for a purpose to be described more fully below. Also mounted on the frame 30 adjacent the opening of keeper chamber 35 is a striker or camming plate generally denoted by reference numeral 39, which plate will also be described more fully below.

The sliding bolt mechanism generally denoted by reference numeral 32 includes a sliding bolt 34 of a solid cylindrical configuration, and incldes an enlarged forward portion 36 and a rearward portion 38 of somewhat lesser diameter. The bolt is normally retained in an elongate cylindrical housing 40 which in turn is retained between the side panel 26 and 28 on an intermediate panel 42 by a plurality of retaining or holding straps 44. The housing 40 has an open end 46 and the housing is retained so that the open end 46 is in the same plane as an opening 48 in the end panel 24, as best illustrated in FIGURE 5.

The sliding bolt 34 is slidably mounted in the housing 40, and a coil spring 49 is mounted about the bolt 34 and retained between an end flange 50 at one end of the housing 40, and an enlarged ring portion 54 on the bolt 34, this end of the housing 40 having the opening 52 therein, for this purpose. Thus, by referring again to FIGURE 5, it will be observed that the bolt 34 is illustrated in its projected position, with the forward end of the portion 36 extending outwardly through the opening 48 in the end panel 24 and into the keeper chamber 35, the spring 49 normally biasing the bolt 34 outwardly through the opening 48. A plurality of setscrews 56 are positioned in the housing 40 in order to provide a stop for the bolt 34, thereby limiting the extent to which the bolt 34 may be moved by the spring 49 outwardly through the opening 48.

The bolt 34 as illustrated in FIGURE 5 is in extended or locked position, with the forward end of the portion 36 extending into keeper chamber 35 in frame 30. Of course, it will be realized, that in order to open the door 14, it will be necessary to withdraw the bolt 34 from this locked or extended position. Thus, first and second operating means for so moving the bolt are provided. The door 14 is provided with the conventional inside handle 58 which is mounted on the inside panel 26 and has a square shaft 60 extending inwardly through the door towards the outside panel 28, the shaft 60 being supported in the intermediate panel 42. It will be appreciated, of course, that the handle 58 and associated shaft 60 are normally used to operate the conventional lock 20 and 22. A lever 62 is mounted on the shaft 60 by a pair of washers 64 and 66 and cotter pins 68, the lever 62 normally rotating with the shaft 60 as the inside handle 58 is manipulated through a normal rotation. A linkage member 70 is connected at one end to the portion 38 of the bolt 34, the portion 38 extending outwardly through the aperture 52 in the housing 40. The linkage member 70 includes an elongate slot 72 therein in which a pin 74 on lever 62 extends so as to allow the bolt 34 to move to the position illustrated in FIGURE 5 without moving the crank 62 and thus the handle 58. However, it will be appreciated, that upon a clockwise movement of the handle 58 when the linkage 70 and crank 62 are in the position illustrated in FIGURE 5, the bolt 34 will be caused to withdraw from this position to the position illustrated in FIGURE 4.

Figure 7:
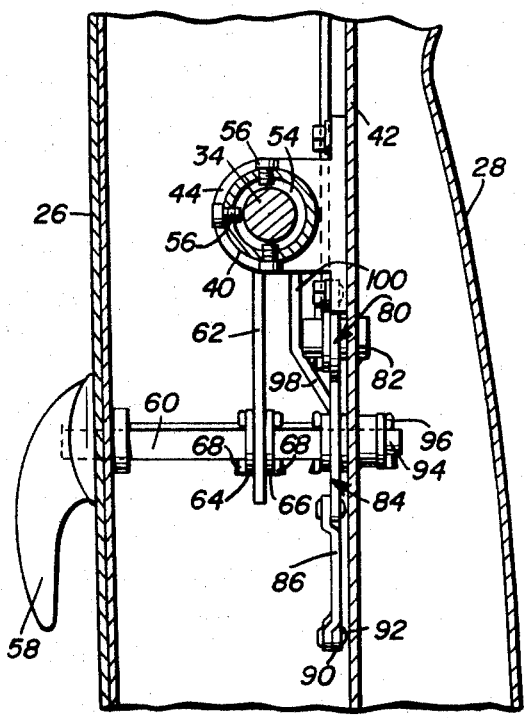
FIGURE 7 is an enlarged vertical sectional view taken substantially on the plane of line 7—7 in FIGURE 5.
Figure 8:
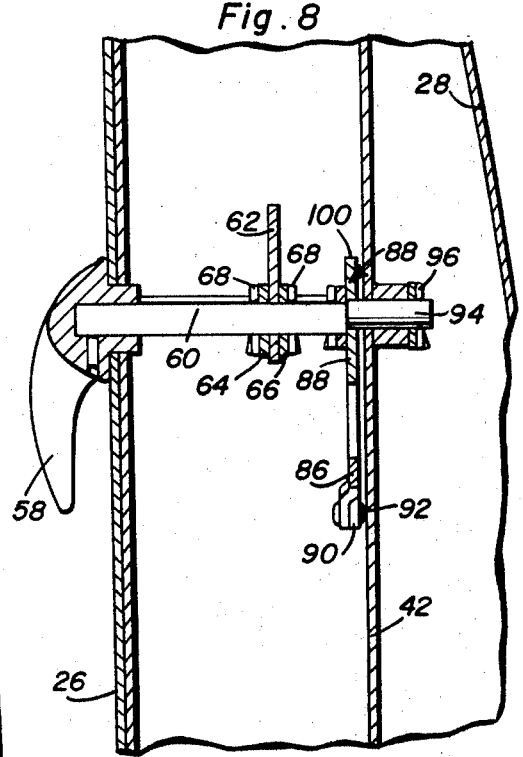
FIGURE 8 is an enlarged vertical sectional view taken substantially on a plane of line 8—8 of FIGURE 5.
Figure 9:
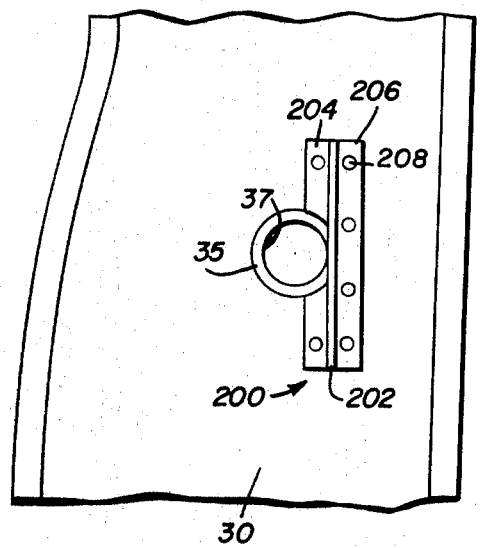
FIGURE 9 is a perspective view of a portion of a vehicle frame, similar to the view of FIGURE 2, illustrating a portion of the second preferred embodiment of the present invention.

Referring again to FIGURES 4 and 5, as well as to FIGURES 7 and 8, it will be observed that the latch 18 of outside handle 16 is connected by means of a connecting rod 76 to a first leg 78 of bellcrank 80, the crank 80 being rotatably mounted on a pivot or stud member 82, which stud 82 is welded or otherwise fixedly mounted on the panel 42. The crank 80 includes a second leg 84 to which is connected a connecting linkage member 86, the linkage member 86 connected at the other end thereof to a second crank or lever 88, which includes an arm portion 90 connected by pin 92 to the linkage 86. The crank or lever 88 is mounted on a pivot post 94 which is fixed on the panel 42 and which is not connected in any way to the shaft 60. A cotter pin 96 retains the crank or lever 88 on the post 94. The lever 88 includes a laterally offset portion 98 as a portion of the upper arm 100, and the upper end of the arm 100 is connected by a pin 102 to a linkage member 104. The pin 102 is mounted in a slot 106 in the linkage member 104, and the other end of the linkage member 104 is connected to the portion 38 of bolt 34 adjacent the connection of linkage member 70 thereto. Thus, by referring to FIGURES 4, 5, 7 and 8 in particular, it will be readily apparent that the bolt 34 may be moved independently by either the inside handle 58 or by the outside latch 18 from its extended position as illustrated in FIGURE 5 to the withdrawn position as illustrated in FIGURE 4.

Figure 6:
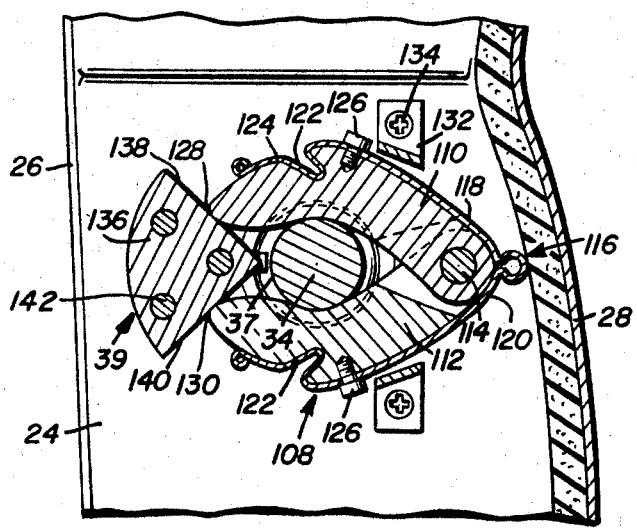
FIGURE 6 is an enlarged vertical sectional view taken substantially on the plane of line 6—6 of FIGURE 5.

Referring now particularly to FIGURES 1, 2, 3 and 6, it will be observed that a first bolt retaining and releasing mechanism generally denoted by reference numeral 108 is mounted on the end panel 24 of door 14. The retaining and releasing mechanism 108 comprises a pair of keeper or retaining plate members 110 and 112 which are both pivotally mounted at one end on a pivot pin 114 so as to be swingable about a common axis of rotation at the one end of the plates. A flat steel spring generally denoted by reference numeral 116 and including upper and lower arm portions 118 and 120 respectively is wrappingly engaged in substantial encircling engagement about the outer peripheral edges of the plates 110 and 112 as best illustrated in FIGURE., the spring and 112 as best illustrated in FIGURE 6, the spring in the recesses 124 in the plates 110 and 112 so as to be retained thereon. There are also setscrews 126 provided in order to retain the spring arms in place about the plates 110 and 112. Thus, by referring to FIGURES 1 and 3 for example, it will be observed that the spring 116 operates to bias the plates 110 and 112 together about the pivot pin 114 until the forward ends 128 and 130 of the plates 110 and 112 are in contact, and the plates substantially close the opening 48 in the end panel 24. Thus, it will be appreciated that at this time, the bolt 34 will be retained in its innermost position, as the plates 110 and 112 obstruct the opening 46 and resist the biasing force of spring 49, the bolt of course abutting the plates. A support strap 132 is mounted, as by screws 134, over the plates 110 and 112 for protection thereof.

The striker or camming plate 39 referred to above comprises a wedge-shaped plate 136 having rearwardly diverging camming surfaces 138 and 140 thereon, the plate 136 being fastened to the frame 30 by means of screws 142. As will be observed in FIGURES 1, 2 and 6, the plate 136 is located inwardly of the keeper chamber 35, and thus, as best illustrated in FIGURE 6, as the door 14 is closed, the forward edges 128 and 130 of plates 110 and 112 will strike the surfaces 138 and 140 respectively of the plate 136 thereby forcing the plates 110 and 112 apart as illustrated in FIGURE 6. When the door is fully closed, the plates 110 and 112 will thus no longer be in obstructing relationship to the opening 48 in end panel 24, and the opening 48 will be in alignment with the keeper chamber 35. Thus, at this time, the force of coil spring 49 will cause the bolt 34 to shoot outwardly through the openings 46 and 48 into the chamber 35 whereby the door will be securely locked, and may be opened only by actuation of the handle 58 or latch 18 as described above. The bushing or insert 37 referred to above is provided in order to prevent rattling or lateral movement of the bolt 34 when it is in the position illustrated in FIGURE 5. Further, the plates 110 and 112 will bear down against the forward end 36 of the bolt 34 when it is in its extended position thus also tending to prevent rattling thereof and adding to the desirable operating features of the invention.

Referring now to FIGURES 9–13, the second preferred embodiment of the present invention will be described. First of all, it will be readily appreciated that the bolt 34 and housing 40 as well as the cranks or levers 100 and 62 and various connecting linkages are the same in this embodiment of the invention as in the embodiment described in relation to FIGURES 1–8 above. Thus, the manner of withdrawing the bolt 34 from the keeper chamber 35 is the same as described above. The major difference in this embodiment of the invention from that described above is in the retaining and releasing mechanism referred to above by reference numeral 108 and referred to in this embodiment of the invention by reference numeral 144. The retaining and releasing mechanism 144 comprises a housing generally denoted by reference numeral 146 mounted on the end panel 24 of door 14 by means of screws 148. The housing 146 has an opening 150 in the rear wall 152 thereof, the opening 150 corresponding to the opening 48 in the end panel 24. The housing 146 includes a cover plate 154 retained thereon by the screws 148, the cover 154 including a pair of elongate parallel equal length slots 156 and 158 therein. Further, the cover plate 154 includes an opening 160 coaxial with and corresponding to the opening 150 in wall 152 and opening 48 in end panel 24. Thus, it will readily appear that the bolt 34 would be able to move through the openings 48, 150 and 160 without any difficulty unless an obstruction were placed in the path thereof. To provide such an obstruction for selectively retaining the bolt 34 in withdrawn position, a sliding plate generally denoted by reference numeral 162 is provided in the housing 146, the plate 162 comprising two half portions 164 and 166. A pair of spaced channels 168 and 170 are formed in the plate 162 between the half portions or layers 164 and 166 at the rear end thereof, the channels opening to the rear of the plate 162 and a pair of guide pins 172 and 174 are received respectively within the channels 168 and 170. The guide pins 172 and 174 are received through the end wall 176 of the housing 146 and secured therethrough by suitable mounting means such as the bolts 178, and the guide pins 172 and 174 thus provide lateral and non-rotatable stability for the plate 162 while allowing it to slide within the housing 146. Further, a pair of similar heels 182 extend downwardly from the plate 162 and bear against the wall 152 of the housing providing additional stability for the plate 162 as it slides therethrough. A pair of upstanding horizontally projecting legs 184 and 186 are formed at the front end of plate 162, the free ends of the legs extending through the slots 158 and 156, respectively. Thus, it will be appreciated that the amount of sliding of the plate 162 in the housing 146 is controlled by the length of the slots 156 and 158.

Figure 10:
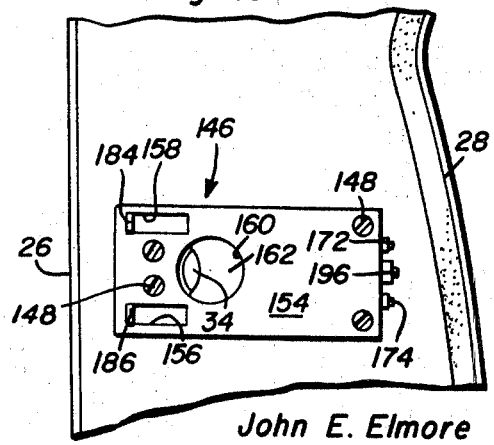
FIGURE 10 is an elevational view of a portion of a vehicle door also illustrating the second embodiment of the present invention.
Figure 11:
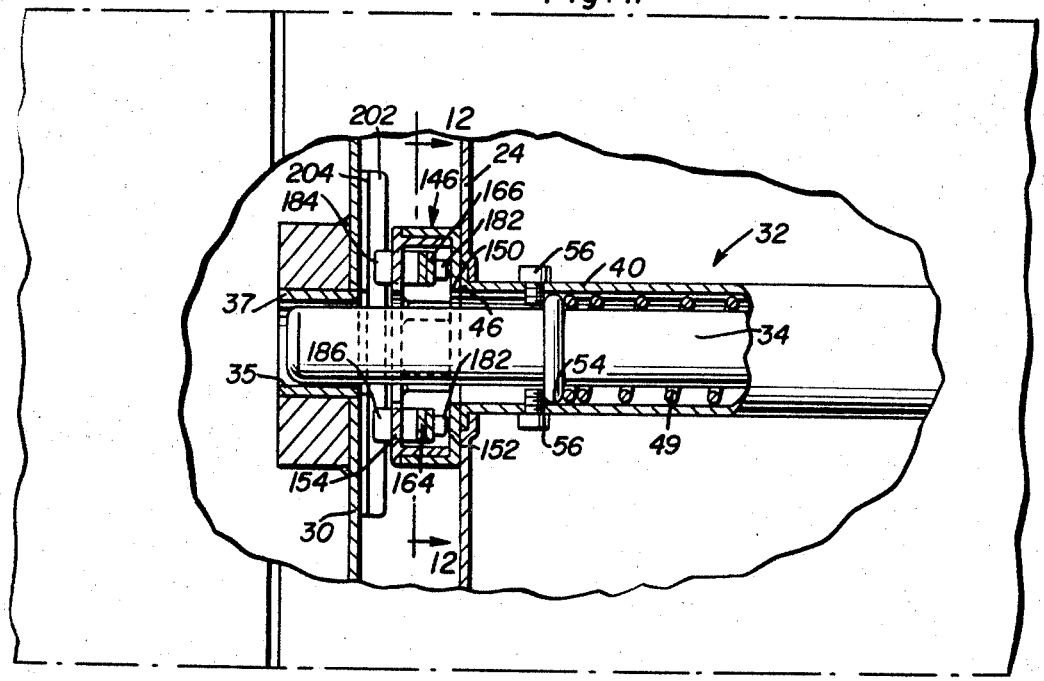
FIGURE 11 is a partial enlarged view similar to that of FIGURE 5 with parts broken away to illustrate the second preferred embodiment of the present invention.
Figure 12:
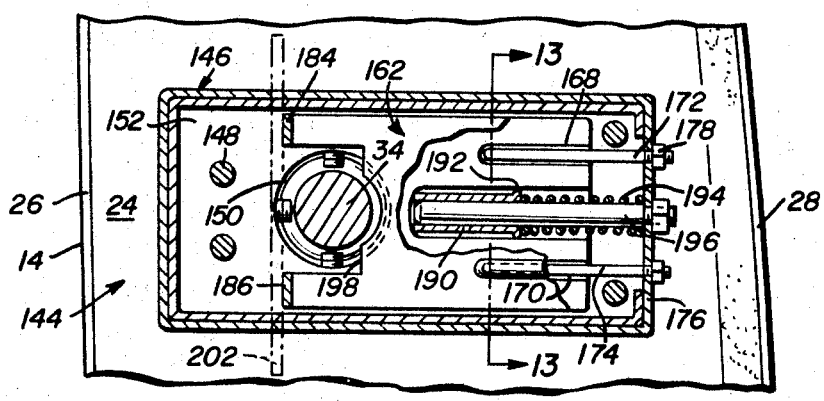
FIGURE 12 is an enlarged vertical sectional view taken substantially on the plane of line 12—12 of FIGURE 11.
Figure 13:
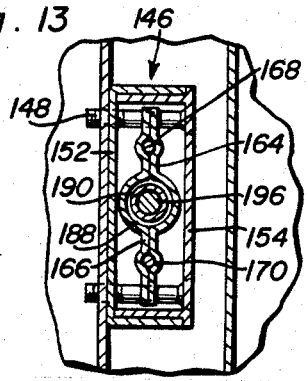
FIGURE 13 is an enlarged partial vertical sectional view taken substantially on the plane of line 13—13 of FIGURE 12.

A centrally located channel 188, somewhat larger than the channels 168 and 170 described above, is provided between the channels 168 and 170 and an insert member 190 is fixedly positioned in the channel, the insert member 190 having an enlarged end flange 192. A coil spring 104 is positioned between the enlarged end flange 192 of the insert member 190 and the end wall 176 of the housing 146 about a rod 196, the spring 194 thus acting to bias the plate 162 to a forward position as illustrated in FIGURE 10 for example, with the legs 184 and 186 resting against the forward end of the slots 158 and 156. The plate 162 is provided with a cut out portion 198 in the forward end thereof between the legs 184 and 186, and thus, as best illustrated in FIGURE 12 for example, when the plate 162 is moved rearwardly within the housing 146, the cutout portion will register with the aligned openings 160, 150 and 48 whereby the bolt 34 may be shot outwardly of the housing into the keeper chamber 35 in order to lock the door in a striker fashion as described above.

A striker member generally denoted by reference numeral 200 and including a plate 202 extending normally or perpendicularly to the frame 30, and a pair of legs 204 and 206 fastened by suitable fastening means 208 to the frame is provided, the plate 202 being positioned adjacent and inwardly of the keeper chamber 35. Thus, it will be readily apparent by viewing FIGURES 11 and 12 in particular, that when the door 14 is opened, the plate 162 will be in its forwardmost position in closing relationship over the aforementioned openings, and the bolt 34 is retained thereby in its withdrawn or unlocked position. However, when the door is closed, the legs 184 and 186 will strike the striker plate 202 thus forcing the sliding plate 162 rearwardly in the housing 146 against the force of spring 194, until such time as the door is fully closed. At this time the cutout portion 198 will be in registry with the aforementioned openings 160, 150 and 48, thus allowing the bolt 34 to be activated or shot.

In view of the foregoing, it will be readily appreciated that the instant invention comprises means for securely locking a motor vehicle door in closed position so as to eliminate any accidental springing open thereof as often happens during an accident or the like. The invention includes the slidable safety bolt mounted within the door with means connecting the bolt to both the inside and outside door handles whereby the bolt may be withdrawn the locker position from either the inside or the outside of the vehicle. The invention further includes two embodiments of bolt retaining and releasing mechanisms for allowing the bolts to be automatically shot into a keeper chamber when the door is closed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A door locking mechanism, said door hung in a frame and including inner and outer side panels, and an end panel comrpising: a sliding bolt, means mounting said bolt in said door for movement inwardly between said side panels and outwardly through said end panel, means for biasing said bolt outwardly through said end panel, dual means for retracting said bolt comprising an inside handle mounted upon a first shaft, a first lever, one end thereof connected to said shaft, the opposite end pivotally connected to one end of a first link, the opposite end of said link pivotally connected to the inward end of said bolt, an outside handle pivotally linked to one end of a second lever which in turn is mounted upon a second shaft, the opposite end of said second lever pivotally connected to one end of a second link, the opposite end of said second link pivotally connected to the inward end of said bolt, means on said door for retaining said bolt in a retracted position between said side panels, and means on said frame for overcoming said retaining means whereby said biasing means will operate to force said sliding bolt outwardly through said panel when said door is closed, and means for limiting the extent to which said bolt may be moved outwardly.

2. The combination of claim 1 wherein said retaining means comprises plate means movably mounted on said end panel and means for normally biasing said plate means into the path of travel of said bolt and wherein said overcoming means comprises a camming means mounted on said frame for moving said plate means out of the path of travel of said bolt when said door is closed whereby said biasing means will operate to move said bolt into a keeper chamber in said frame.

3. The combination of claim 2 wherein said plate means comprises a first and second plate means, spring means in substantially encircling engagement with both of said plate means for forcing said plate means together, said camming means including first and second diverging camming faces adapted to contact said first and second plate means respectively when said door is closed for moving said plate means apart.

4. In a sliding bolt type door lock including a door hung in a frame and having side panels and an end panel, a bolt slidably mounted in said door normally biased outwardly through an opening in said end panel, and keeper chamber in said frame, a bolt retaining and releasing mechanism comprising one or more retaining plates movably mounted at one end of said end panel, means for normally biasing said plates in substantial covering relationship with said end panel opening, said biasing means comprising spring means in substantial encircling engagement with said retaining plates forcing said plates together, and means on said frame adjacent said keeper chamber for moving said retaining plates away from said end panel opening upon closing of said door whereby said bolt will be moved into locking engagement with the keeper chamber.

5. The combination of claim 4 wherein said means on said frame adjacent said keeper chamber for moving said retaining plates away from said end panel opening upon closing of said door comprising a camming means including first and second diverging camming faces adapted to contact said retaining plates when said door is closed for moving said plates apart.

6. The combination of claim 1 wherein said retaining means comprises plate means slidably mounted on said end panel, means for normally biasing said plate means into the path of travel of said bolt whereby said bolt will be retained in withdrawn position, and said overcoming means comprising means on said frame for moving said plate means out of said path of travel after the door is closed.

7. The combination of claim 6 wherein said moving means comprises a striker plate extending laterally outwardly of said frame, said plate means including leg means thereon for contacting said striker plate as said door is closed.

8. In a sliding bolt door lock for motor vehicles including a door hung in a frame and having side panels and an end panel, a bolt slidably mounted in said door and normally biased outwardly through an opening in said end panel, and a keeper chamber in said frame, a bolt retaining and releasing mechanism comprising, a retaining plate slidably mounted on said end panel, said retaining plate normally in obstructing relationship with said sliding bolt whereby said bolt will be retained in withdrawn position within said door, cutout means in said retaining plate, means on said frame adjacent said keeper chamber for moving said retaining plate when said door is closed whereby said cutout portion will register with the opening in said end plate and said bolt will be moved into locking engagement in said keeper chamber.

References Cited
UNITED STATES PATENTS

| | | | |
|---|---|---|---|
| 1,918,563 | 7/1933 | Roedding | 292—335 |
| 2,298,598 | 10/1942 | Sitter | 292—335 |
| 3,069,889 | 12/1962 | Johnstone et al. | 292—167 |
| 1,185,462 | 5/1916 | Antelmann | 292—46 |
| 1,191,679 | 7/1916 | Dziegielewski | 292—46 |

MARVIN A. CHAMPION, *Primary Examiner.*

E. J. McCARTHY, *Assistant Examiner.*